2 Sheets—Sheet 1.

G. E. WARING, Jr.
Pocket Check-Book.

No. 8,199. Reissued April 23, 1878.

Witnesses
Wm. M. Ingham
Bern. J. Vetterlein

Inventor.
Geo. E. Waring Jr
by Charles F. Blake
his Attorney

THE NORRIS PETERS CO., PHOTO-LITHO., WASHINGTON, D. C.

G. E. WARING, Jr.
Pocket Check-Book.
No. 8,199. Reissued April 23, 1878.
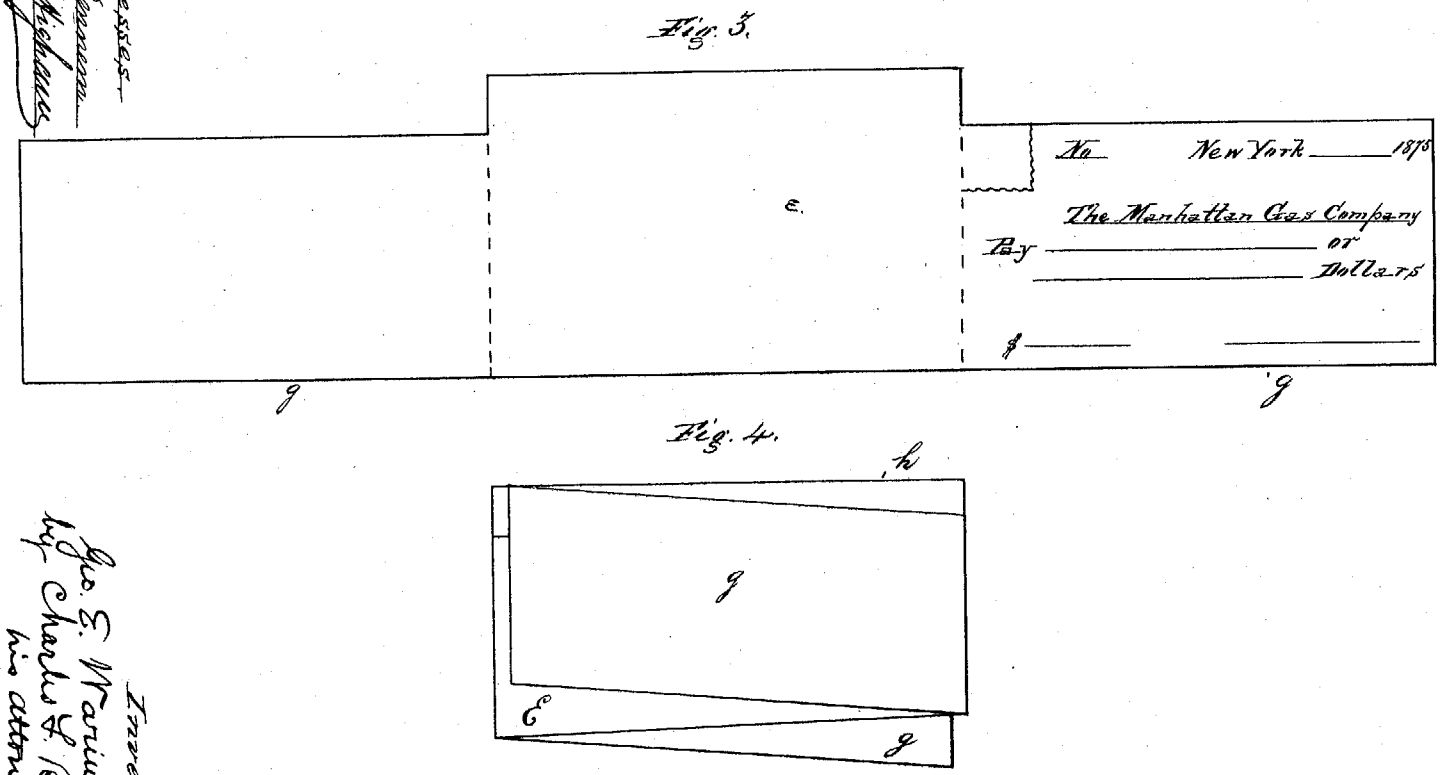
Witnesses.
H. L. Bennett
Benn Higham
Inventor.
Geo. E. Waring Jr
by Charles F. Blake
his attorney
THE NORRIS PETERS CO., PHOTO-LITHO., WASHINGTON, D. C.

UNITED STATES PATENT OFFICE.

GEORGE E. WARING, JR., OF NEWPORT, RHODE ISLAND.

IMPROVEMENT IN POCKET CHECK-BOOKS.

Specification forming part of Letters Patent No. 183,347, dated October 17, 1876; Reissue No. 8,199, dated April 23, 1878; application filed January 22, 1878.

*To all whom it may concern:*

Be it known that I, GEORGE E. WARING, Jr., of the city of Newport, State of Rhode Island, have invented a new and useful Pocket Check-Book as an article of manufacture, of which the following is a specification, reference being had to the accompanying drawings, in which—

Figure 1:
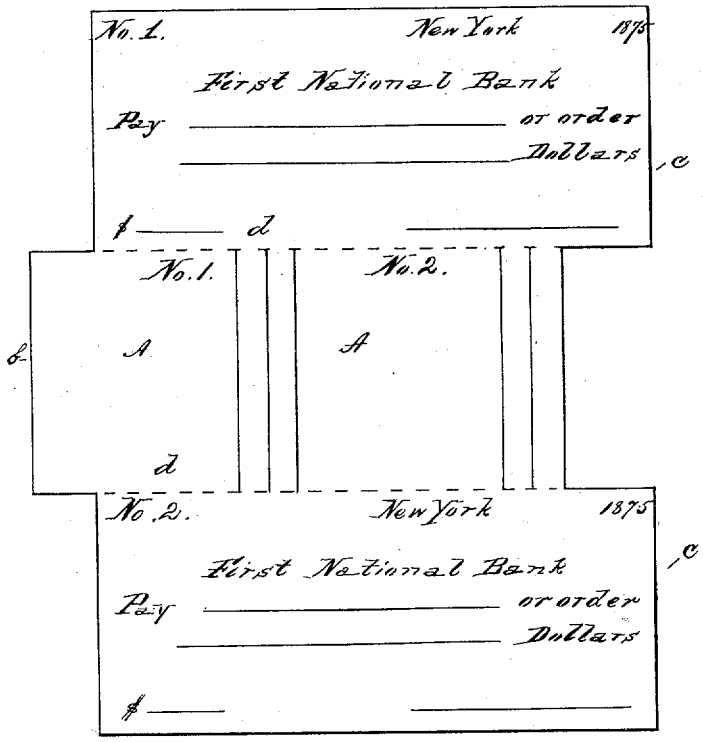
Figure 1:
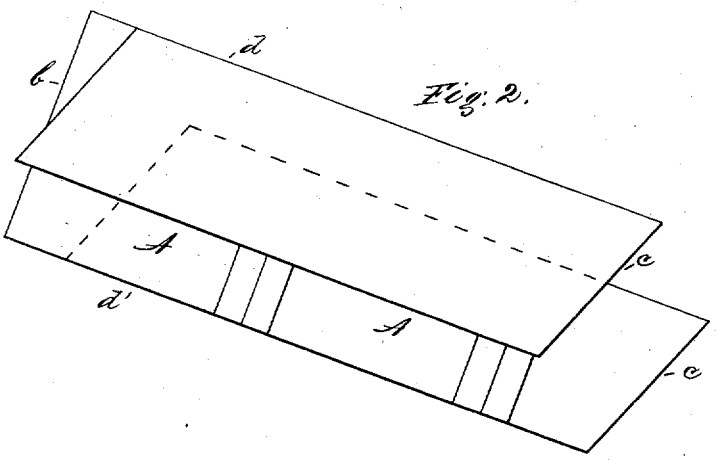

Figure 1 represents a face view; Fig. 2, perspective, showing manner of folding; Fig. 3, face view of another mode of making my invention; Fig. 4, perspective of same.

Like letters indicate like parts in all the drawings.

The object of my invention is to provide a pocket check-book which shall at once be convenient to carry in the pocket, and which shall at the same time be provided with suitable stubs having sufficient surface to enable the user to keep the record of his checks drawn and of his deposits.

Prior to my invention pocket check-books were made having the stub at the rear end of the check, from which the check was torn when used. Such check-books were found, in practice, to be too long to be carried in the pocket.

Other pocket check-books had the stubs extending all along the tops of the checks; but such books were too broad, and the stubs were of an inconvenient and unusual form.

My invention avoids all these difficulties; and consists in so constructing the check-book that it shall be not materially longer or broader than the check itself, while at the same time it provides stubs of the size and form used in ordinary office check-books.

In my check-book the stubs A A are of about the usual size, and are provided at their rear end with a lip or binding-piece, *b b*, to bind them firmly into the back of the book. The checks *c c* are attached to them, not at their front, but at the top and bottom, at the line *d d*, so that the stubs extend from the bound back nearly the whole length of the check and between them. The two stubs are formed of one piece of paper, the second one following the first in the length of the book. They are about the size of those in any ordinary check-book, and afford the usual facilities for recording the checks and for keeping a deposit account. The top check is folded down over the face of the stub, and the bottom check is folded up behind it, so that when both checks are folded in they and their stubs are completely protected by the cover. Any convenient number of these checks may thus be bound up, and the book, when complete, is about the length and breadth of an ordinary check, and remains of uniform shape as the checks are removed.

Another mode of practicing my invention is to take a piece of paper three times the length of the desired check. This paper is then divided by folding into three equal parts. The middle section *e* may be divided by a line into two stubs. Over these stubs and at their ends the end divisions *g g* of the paper are folded, which ends constitute two checks. The paper thus folded has at its top a lip of paper, *h*, nearly as long as the length of the two stubs or middle section, and of sufficient width for binding purposes. These may be bound together in convenient number, and constitute a check-book of the size of an ordinary check.

What I claim, and desire to secure by Letters Patent, is—

1. The combination, in a check-book, of checks and stub-pieces of substantially the same size, so united that two checks lie between every two stub-pieces, substantially as specified and set forth.

2. A check-book in which the checks are folded in upon the stub-piece, which lies between the checks, and which is alone attached to the back of the book.

GEO. E. WARING, JR.

Witnesses:
BERN. T. VETTERLEIN,
FRANK B. PORTER.